(12) United States Patent  
Smith et al.

(10) Patent No.: US 8,966,600 B2  
(45) Date of Patent: Feb. 24, 2015

(54) METHOD, APPARATUS AND SYSTEM FOR CONTROLLING ACCESS TO COMPUTER PLATFORM RESOURCES

(75) Inventors: Ned M. Smith, Hillsboro, OR (US); Victoria C. Moore, Phoenix, AZ (US); Moshe Valenci, Jerusalem (IL); Craig T. Owen, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 958 days.

(21) Appl. No.: 12/976,942

(22) Filed: Dec. 22, 2010

(65) Prior Publication Data

US 2012/0167187 A1    Jun. 28, 2012

(51) Int. Cl.
*H04L 29/00* (2006.01)
*H04L 9/32* (2006.01)

(52) U.S. Cl.
CPC .................................. *H04L 9/3215* (2013.01)
USPC .......................................................... 726/7

(58) Field of Classification Search
None
See application file for complete search history.

(56) References Cited

U.S. PATENT DOCUMENTS

| | | | |
|---|---|---|---|
| 7,249,381 B2 * | 7/2007 | Telesco | 726/27 |
| 7,590,767 B2 * | 9/2009 | Fujita et al. | 710/8 |
| 8,041,346 B2 * | 10/2011 | Tyhurst et al. | 709/219 |

* cited by examiner

*Primary Examiner* — Jeffrey Pwu
*Assistant Examiner* — Helai Saleh
(74) *Attorney, Agent, or Firm* — Blakely, Sokoloff, Taylor & Zafman LLP

(57) ABSTRACT

A manageability engine, and/or operations thereof, for controlling access to one or more resources of a computer device. In an embodiment, the manageability engine executes an authentication agent to perform authentication of a local user of a computer platform which includes the manageability engine. In another embodiment, the manageability engine includes a device driver to control an input/output device for the local user to exchange an authentication factor via a trusted path between the input/output device and the manageability engine.

20 Claims, 6 Drawing Sheets

METHOD, APPARATUS AND SYSTEM FOR CONTROLLING ACCESS TO COMPUTER PLATFORM RESOURCES

BACKGROUND

1. Technical Field

Embodiments generally relate to techniques for controlling access to one or more computer resources. More particularly, certain embodiments provide a method for securely exchanging an authentication factor for use in authenticating a local user of a computer platform.

2. Background Art

In today's society, it has become necessary to protect information stored within a computer in order to prevent unauthorized persons from downloading information onto a floppy disk, digital tape or other type of storage device. In certain situations, this information may be sensitive in nature such as a trade secret or privileged information. The importance of controlling user access to information stored on a computer has encouraged the creation of different access control mechanisms.

Many conventional access control mechanisms are operating system (OS) dependent. For example, in a computer-based password mechanism, user authentication involves the OS requesting the user to manually enter a password after completion of the boot process. The password may be entered via an alphanumeric keyboard or a keypad. If the entered password matches a password locally stored at system configuration of the computer, the user is granted access to the stored information.

Another type of access control mechanism is a smartcard authentication mechanism. Smartcards are an attractive approach for user authentication due to their convenient form factor and ease of use. However, similar to the other control access mechanisms, user authentication is based on the correct operations of the OS initiating an exchange of messages with the smartcard.

These above-described user authentication techniques are prone to a number of disadvantages. For example, due to their OS dependency, they are subject to deliberate virus-based corruption, which could result in the installation of a backdoor to circumvent the authentication software. More specifically, the virus may modify the "login" portion of the OS so that when a special key combination or sequence is entered, user authentication functionality would be entirely bypassed.

Hence, it is desirable for a more robust user authentication technique, independent of the operations of the OS, for controlling access to platform resources.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Various embodiments provide a manageability engine (ME) in a computer platform which allows secure access to one or more resources of the platform. In an embodiment, the ME may execute an authentication client such as one implementing communications according to a Kerberos or other network authentication protocol.

By availing of certain hardware-based security mechanisms, such an authentication client may be isolated or otherwise protected from malware attacks on Basic Input/Output System (BIOS) or other software which, for example, is executed by a host processor of the platform. By way of illustration and not limitation, an authentication factor such as a user password, biometric information, SmartCard key, or other such information may be supplied to the ME's authentication client—e.g. via a trusted path between an input device and the ME. The trusted hardware path may prevent malware from sniffing and/or changing such authentication factors—e.g. through modification of a keyboard driver which is run on an OS of the host processor. Protecting authentication factors from improper detection and/or manipulation may aid in restricting access to an enterprise domain associated with the platform.

In an embodiment, the ME may include or otherwise have access to a device driver which is isolated or otherwise protected from access by a host context of the platform. In an embodiment, the isolated device drive of the ME may control operation of an input and/or output (I/O) device to exchange information in support of evaluating one or more authentication factors.

In an embodiment, the authentication client of the ME may perform multi-factor authentication of a local user of the computer platform which includes the ME. Such multi-factor authentication may include, for example, the authentication client evaluating at least one authentication factor which has been provided to the ME independent of one or more execution environments of the computer platform. For example, this at least one authentication factor may be retrieved independent of an execution context which is separate from and supported by an execution context of the ME—which is for running of the authentication client. In an embodiment, such multi-factor authentication may include the ME authentication client evaluating authentication factors accessed via multiple different respective execution environments of the computer platform—e.g. including at least one factor obtained via the trusted path to the ME.

Figure 1:
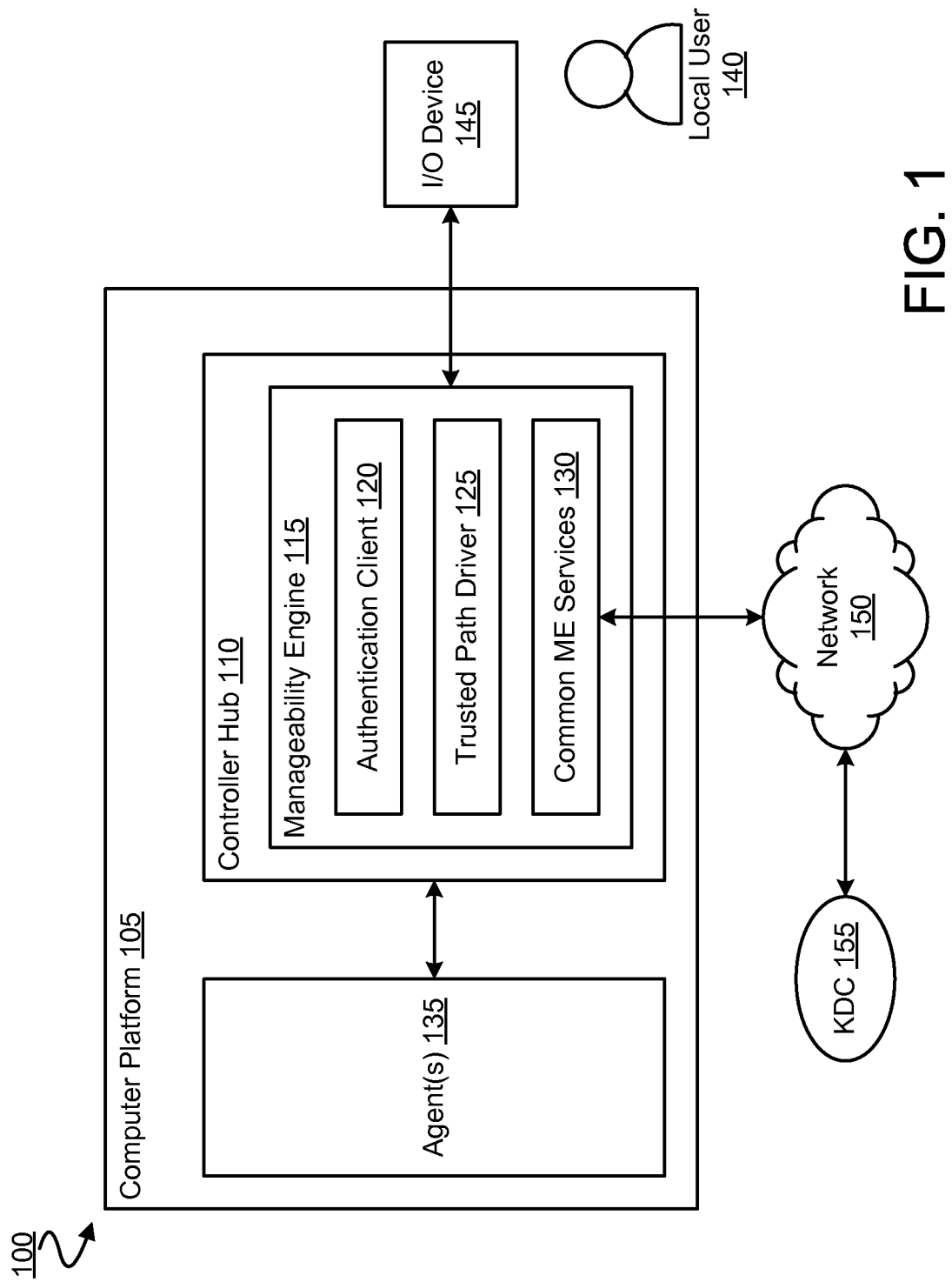
FIG. 1 is a block diagram illustrating select elements of a system for controlling access to a computer resource according to an embodiment.

FIG. 1 illustrates select elements of a system 100 for providing secure access to computing resources according to an embodiment. In an embodiment, system 100 includes a computer platform 105 which, for example, may be available for various types of access by a local user 140 interacting directly with computer platform 105. Computer platform 105 may include one or more of a personal computer (PC), a personal digital assistant (PDA), an Internet appliance, a cellular telephone, a laptop computer, a tablet device, a mobile unit, a wireless communication device and/or any other computing device.

Computer platform 105 may include security mechanisms to variously allow, restrict or otherwise control access to one or more other resources of computer platform 105. By way of illustration and not limitation, computer platform 105 may include a manageability engine (or "management engine" or "ME") 115—e.g. residing in a controller hub 110 of computer platform 105—to provide functionality in support of a determination as to whether some platform resource access is to be provided to local user 140. Alternatively or in addition, functionality of ME 115 may support a determination as to whether some platform resource access is to be provided to some remote agent which, for example, communicates with computer platform 105 via a network 150 of system 100.

In an embodiment, ME 115 may include logic—e.g. hardware and/or executing software—to support remote management/administration of computer platform 105. By way of illustration and not limitation, hardware of ME 115—e.g. a system-on-chip or other hardware including one or more processor cores coupled to a memory—may operate to provide an execution environment for the execution of one or more remote management/administration programs, processes, applications, and/or the like.

For example, ME 115 may execute or otherwise implement one or more common ME services 130. Such common ME services 130 may support access to computer platform 105 via network 150 by a remote system administrator or other such agent—e.g. to provide basic network connectivity. Such network connectivity may, for example, allow a key distribution center (KDC) 155 to provide cryptographic or other key information and/or allow a remote system administrator (not shown) to provide security management, power management, system updates/upgrades, pre-boot configuration, and/or the like. In an embodiment, ME 115 supports various traditional remote management functionalities such as those provided by current Intel® vPRO™ or other Active Management Technology (AMT) functionality, available in various devices from Intel Corporation, Santa Clara, Calif. It is understood that ME 115 may provide any of a variety of additional or alternative functionalities to support remote administration or other management of computer device 105.

In an embodiment, one or more other processes may be executed by ME 115 to extend existing functionality—e.g. to include performing authentication of local user 140. By way of illustration and not limitation, an authentication client 120 may be run in an execution environment of ME 115 to determine and evaluate one or more authentication factors for verification of the identity of local user 140.

Authentication factors to be evaluated by authentication client 120 may be provided to computer platform 105 by different techniques, according to various embodiments. By way of illustration and not limitation, an I/O device 145 which is included in, or which operates as a peripheral device for, computer platform 105 may provide to ME 115 an authentication factor from the local user 140. For example, a dedicate hardware path between the I/O device 145 and the ME 115 is used for such an exchange of an authentication factor. In certain embodiments, ME 115 may include a trusted path driver 125—i.e. a device driver to control operation of the I/O device 145 for such an exchange.

In an embodiment, one or more other authentication factors may be provided to ME 115 by the local user 140 through other—e.g. less direct—paths such as path which includes one or more agents(s) 135 of computer platform 105. Such agents(s) 135 may, for example, variously run in one or more execution environments other than that implemented by ME 115. For example, computer platform 105 may include other hardware (not shown)—e.g. one or more host processors coupled to a host memory, etc.—to implement a Basic Input/Output System (BIOS) execution environment, a general purpose OS execution environment, a pre-boot execution environment, and/or the like for running one or more applications, threads, processes, etc.

Figure 2:
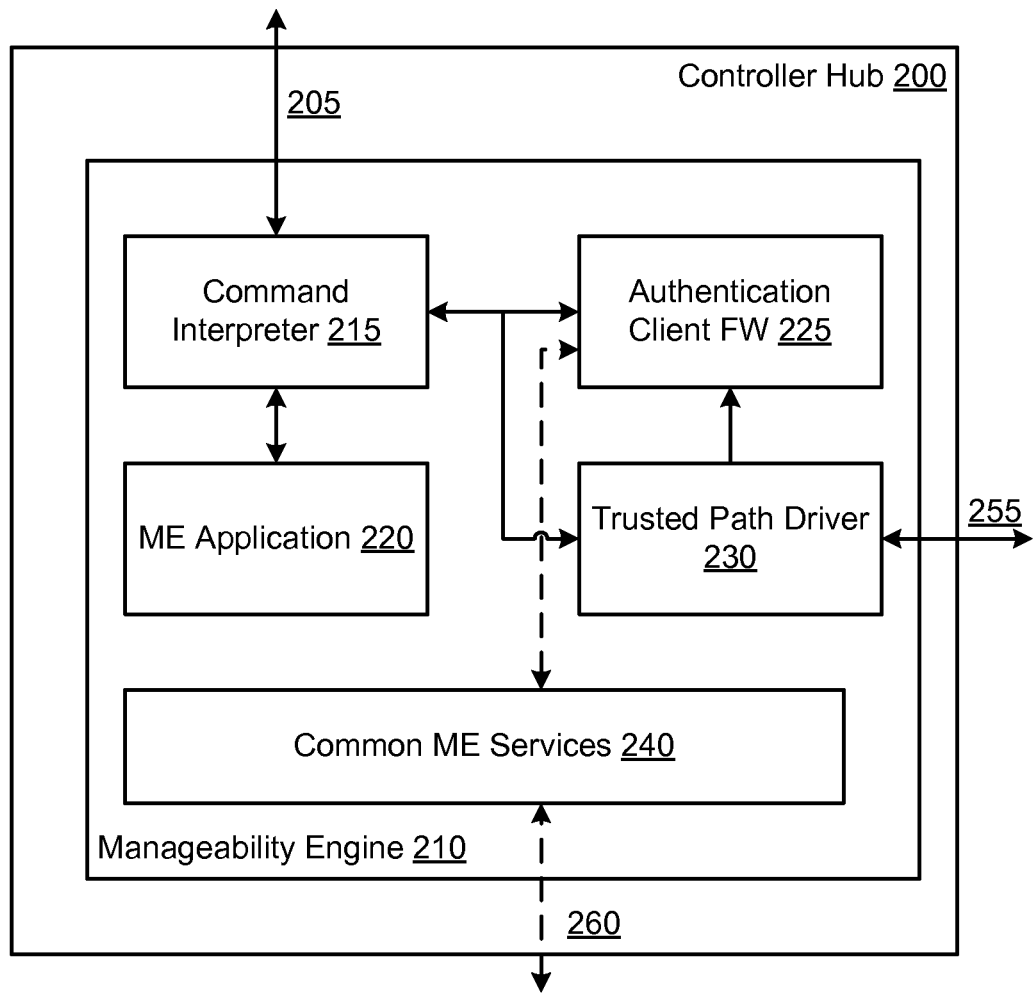
FIG. 2 is a block diagram illustrating select elements of a manageability engine for controlling access to a computer resource according to an embodiment.

FIG. 2 illustrates select elements of a controller hub 200 for providing security mechanisms to protect access to computer platform resources according to an embodiment. Controller hub 200 may include some or all of the features of controller hub 110, for example. In various embodiments, controller hub 200 may include or otherwise support the functionalities of a memory controller hub, an I/O hub, a platform controller hub, and/or the like.

Controller hub 200 may include a manageability engine (ME) 210—e.g. an engine which includes some or all of the features of ME 115. ME 210 may operate to provide remote management/administration functionality in support of operations of a larger computer platform in which controller hub 200 operates. An agent of such a computer platform which is outside of the execution environment of ME 210—e.g. an agent such as a BIOS process, a host OS application or other process, a pre-boot authentication agent, etc.—may provide to a command interpreter 215 of ME 210 a message 205 indicating a need to obtain one or more user credentials necessary to perform an ME operation.

In response to receiving the message 205, the command interpreter 215 may route the request to a trusted path driver 230 that interacts with authentication hardware of the computer platform. In an embodiment, hardware of ME 210 may establish a trusted path 255 between the authentication hardware (e.g. a keyboard, display, speaker, biometric input device, USB or other port, etc.) by which a local user may provide an authentication credential (also referred to herein as an authentication factor). The user credential, such as an enterprise domain password, may be routed to executing authentication client firmware 225.

Authentication client firmware 225 may establish a connection 260 to a domain key distribution center (KDC) or other remote authentication authority—e.g. via a network stack of common ME services 240—in support of evaluating the authentication credential of the local user. By way of illustration and not limitation, a KDC or other remote authority may provide an authentication key to authentication client FW 225—e.g. for performing evaluation of the authentication credential at the ME 210. Alternatively or in addition, authentication client FW 225 may send authentication credential information for the remote authority to perform the evaluation of the authentication credential on its behalf.

Evaluation of one or more authentication credentials of the local user may, for example, be performed with reference to an access control list (ACL) including one or more ACL entries. The ACL may reside in a protected storage area of the computer platform which is included within, or otherwise accessible to the ME which is to retrieve an authentication factor from the local user. Alternatively, the ACL may reside in a remote authority which is to evaluate the authentication factor on behalf of the ME.

In an embodiment, an ACL entry may include information specifying an identity of a user, an authentication factor or other credential which may be used to prove that identity, and/or a realm identifier for use in determining one or more functional roles the local user may participate in and/or privileges the local user may exercise. In an embodiment, a user identity field is comprised of a namespace identifier value that is used to interpret the user name representation. For example, the user name may be represented as a X.509 Relative Distinguished Name (RDN) format or a Kerberos SID or an HTTP Digest string or a locally defined string identifier. A user identity field of an ACL entry may be used to specify Web identities such as an email address, an OpenID, a Cardspace identity or other similar namespace expression. A credential field of an ACL entry may be comprised of a credential type identifier common to the user namespace specification. A role field of an ACL entry may be of a role namespace identifier that is used to interpret the format and semantics of a role designation. For example, a role namespace identifier may reference LDAP directory authorization values or SAML assertion values.

The ACL may be further comprised of an organization namespace authority in the form of an asymmetric public key (aka anchor key) or a Ticket Granting Ticket (symmetric key) that is known only to a trusted key distribution center. Alternatively or in addition, the ACL may be further comprised of a platform identifier that associates the ACL with a particular platform or set of platforms. Alternatively or in addition, the ACL may be further comprised of a platform group identifier that allows the platform to be a member of an organization or group.

A result of evaluating the authentication credential may then be indicated to ME 210. In an embodiment, a result of verifying a local user's one or more authentication credentials may include a remote authority providing or otherwise indicating to ME 210 a ticket that might be used to gain access to particular enterprise domain services, e.g. a particular ME application 220 running in the execution environment of ME 210. For example, the command interpreter 215 may evaluate the ticket to identify one or more access rights as being associated with the local user. In an embodiment, command interpreter 215 may identify based on such evaluation which command or commands the local user is authorized to perform. Based on the evaluation, command interpreter 215 may return an authentication context handle to the execution environment of the agent which provided message 205.

With the handle, the agent of the computer platform which resides outside of the execution environment of ME 210 may execute various commands—e.g. manageability engine commands—by supplying the authentication context handle. Command interpreter 215 may then use the authentication context handle to compare access rights of the agent with the various commands—e.g. to evaluate if the various commands should be executed on behalf of the agent.

Figure 3:
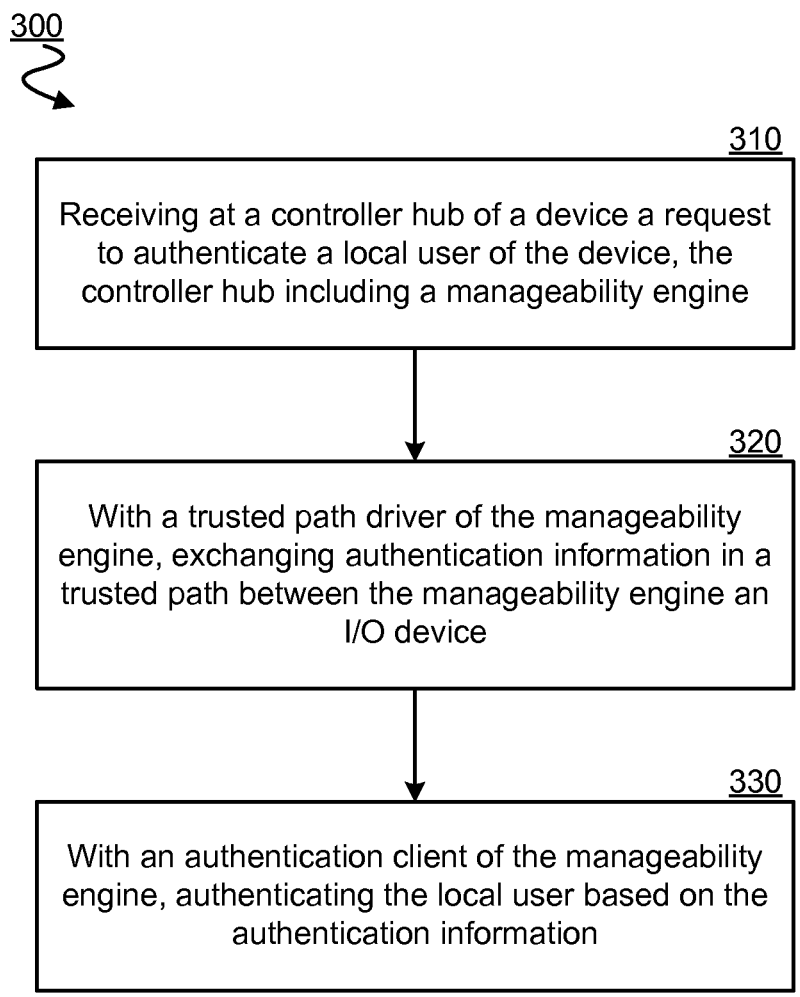
FIG. 3 is a block diagram illustrating select elements of a method for authenticating a user according to an embodiment.

FIG. 3 illustrates select elements of a method 300 for authenticating a local user of a computer platform according to an embodiment. Method 300 may be performed, for example, by controller hub 110.

In an embodiment, method 300 includes, at 310, a controller hub of a device receiving a request to authenticate a local user of the device, where the controller hub includes a manageability engine such as ME 210. The request may be received, for example, from an agent of a computer platform in which the controller hub operates, where the agent is outside of an execution environment implemented by the ME of the controller hub.

Method 300 may further include, at 320, a trusted path driver of the manageability engine, in response to the received request, exchanging authentication information in a trusted path between the manageability engine and an I/O device operated by the local user. In an embodiment, the trusted path includes an isolated hardware path from the trusted path driver to the I/O device.

The trusted path driver may provide the authentication information to an authentication client which executes on the manageability engine. Method 300 may then perform, at 330, the authentication client of the manageability engine authenticating the local user based on the authentication information.

Figure 4:
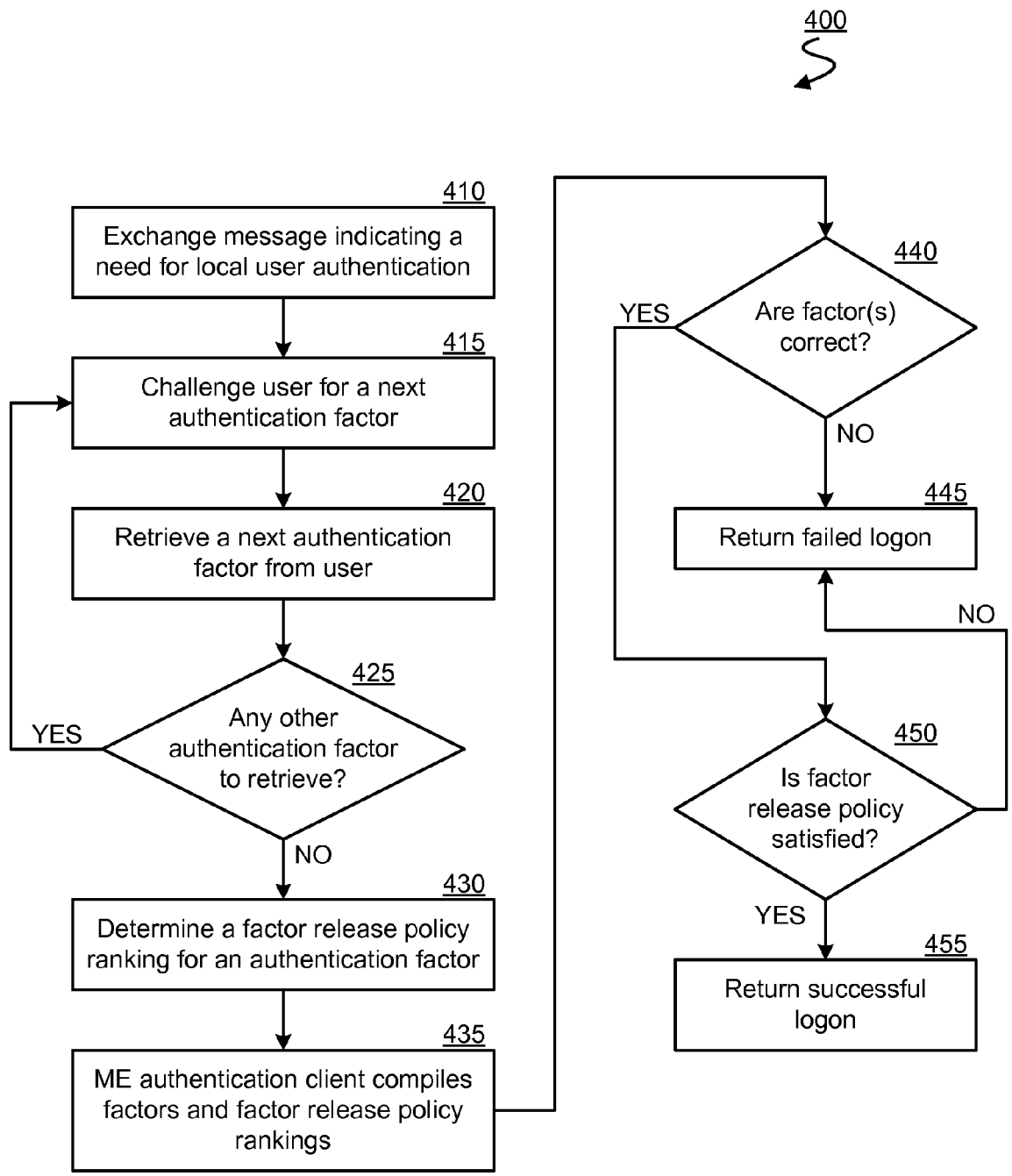
FIG. 4 is a block diagram illustrating select elements of a method for multi-factor user authentication according to an embodiment.

FIG. 4 illustrates select elements of a method 400 for a performing multi-factor authentication of a local user of a computer platform, according to an embodiment. Method 400 may be performed by controller hub 200, for example.

Method 400 may include, at 410, exchanging a message indicating a need for a local user authentication. In response to the received message, method 400 may perform a set of operations 415, 420, 425 at least once—e.g. where each performance of the set of operations 415, 420, 425 is for retrieving a different respective authentication factor to be used in multi-factor authentication of the local user.

At 415, method 400 may challenge the local user for any next authentication factor which is needed for user authentication. Such challenge may, for example, include a ME of the controller hub providing output information to an I/O device (such as a display screen and/or speaker). This output may include a device driver of the ME controlling operation of the I/O device for data output via a trusted path between the ME and the I/O device. Alternatively, the controller hub may provide the output information to an agent which resides on some execution environment of the platform other than that of the ME. Based on the challenge, this next authentication factor may be retrieved from the user, at 420. A determination may be made, at 425, as to whether any other authentication factors need to be retrieved. If so, method 400 may again perform the operations 415, 420, 425 for retrieving another authentication factor.

Once retrieval of additional authentication factors is no longer necessary, method 400 may, at 430, determine a factor release policy ranking for at least one of the authentication factors. A factor release policy refers to information—e.g. issued by a system administrator or other remote authority—indicting one or more conditions under which a given authentication factor is to be given greater, lesser or even no weight in user authentication. A factor release policy ranking refers to a value (e.g. a Boolean value, a score, etc.) which is associated with a particular authentication factor based on whether or how one or more conditions of a factor release policy are determined to be satisfied.

By way of illustration and not limitation, an exemplary set of factor release policies is set forth in Table 1 below:

TABLE 1

Factor Release Policies

| Identity Provider | Factor Name | Factor Type | Interface | Threshold | Action |
|---|---|---|---|---|---|
| Provider A | F1 | Pin | EAM | 2 min. | Do transaction X |
| | F2 | Fingerprint | PBAM | 24 hr. | for Identity Y if: [(F1 + F2) OR |
| | F3 | SmartCard | PBAM | 5 min. | (F1 + F3) |
| | F4 | Password | EAM | 3 days | OR F4] AND UserDialogResult (OK) |
| Provider B | F5 | Retina | PBAM | 5 min. | Do transaction A |
| | F6 | Password | EAM | 24 hr. | for Identity B if: |
| | F7 | Fingerprint | EAM | 8 hr. | [F5 OR F6 OR F7] |

As shown in Table 1, policies for various authentication factors F1, . . . F7 may variously enforce respective conditions under which the authentication factors F1, . . . F7 are to be recognized in a particular authentication evaluation. For example, a given authentication factor may only be effective according to a given policy if it has been provided via an appropriate interface for that factor—e.g. a particular one or a Pre-Boot Authentication Module (PBAM) interface and an Embedded Authentication Module (EAM) such as the I/O device driver of an ME. Alternatively or in addition, the authentication factor may only be effective according to the policy if an age of the factor—e.g. as measured from a time of submission via some I/O device—has not exceeded some threshold value. Alternatively or in addition, the authentication factor may only be effective if it has not violated any factor-specific policy condition, in combination with one or more other factors not violating any of their respective factor-specific policy conditions.

At 435, the ME may compile the retrieved authentication factors and one or more of their respective factor release policy rankings. A determination may then be made, at 440, as to whether all of the necessary authentication factors are correct—e.g. does each authentication factor have a respective value correctly indicating the local user's identity. If not all authentication factors are correct, then a failed logon for the local user may be returned, at 445. Otherwise, a determination at 450 may then be made—e.g. based on factor release policy rankings—as to whether any and all relevant release factor policies are satisfied. If not all release factor policies are satisfied, then a failed logon for the local user may be returned, at 445. Otherwise, a successful logon for the local user may be returned, at 455.

Figure 5:
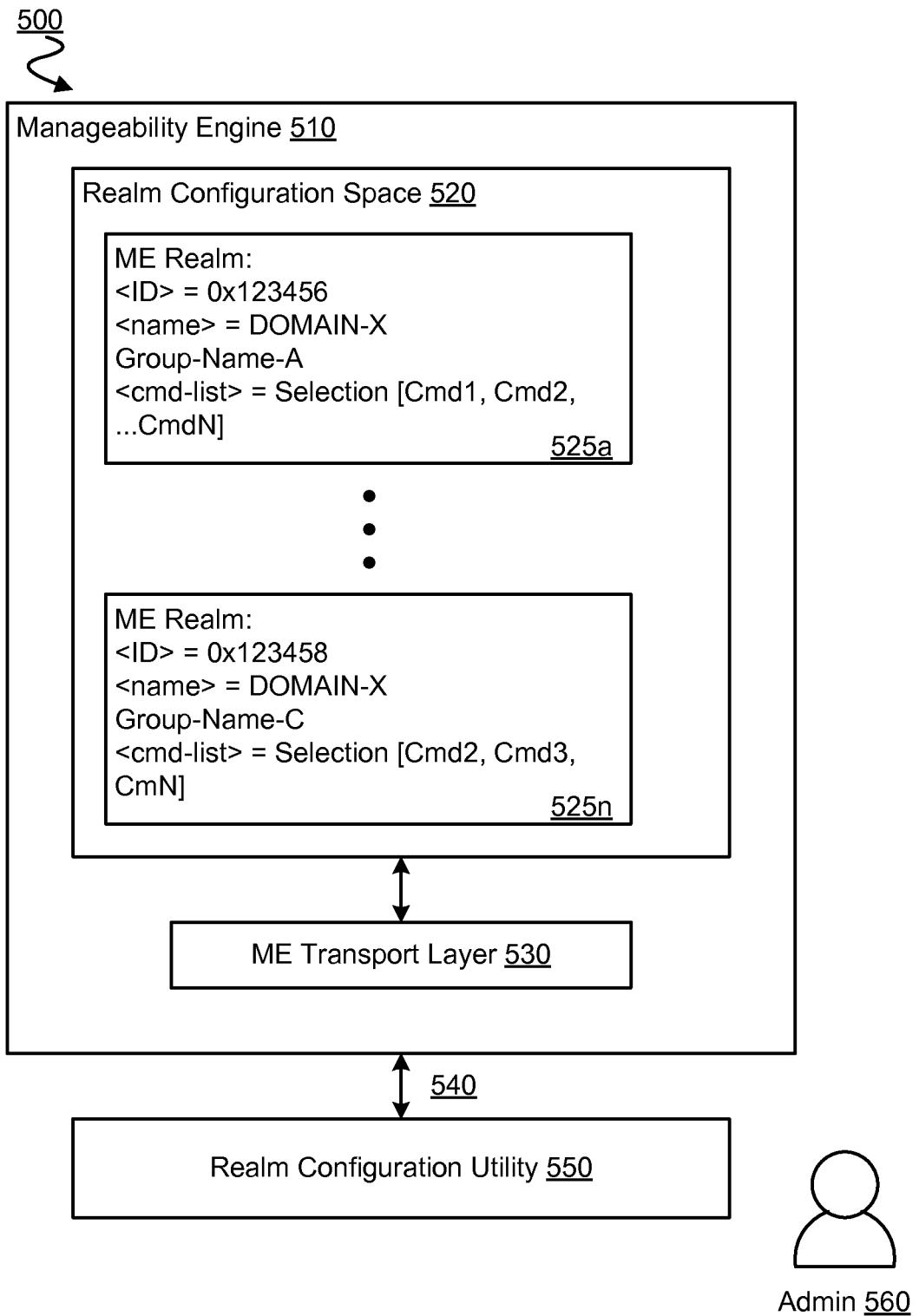
FIG. 5 is a block diagram illustrating select elements of a system for managing access control information according to an embodiment.

FIG. 5 illustrates select elements of a system 500 for managing access information to be used in controlling access to a computer platform, according to an embodiment. System 500 may include a manageability engine (ME) 510 operating in a computer platform, wherein ME 510 includes functionality for authenticating the local user of a computer platform in which ME 510 operates. ME 510 may include some or all of the features of ME 210, for example.

An authenticated local user of the computer platform may be given access to one or more resources of the computer platform—e.g. according to defined access rights which are directly or indirectly associated with the local user.

Evaluation of the one or more authentication credentials of the local user may result in ME 510 identifying a particular realm as being associated with the local user. For example, ME 510—or a remote agent operating on behalf of ME 510—may access reference data, such as the ACL discussed above, to determine that the local user is associated with the particular realm.

ME 510 may include or otherwise have access to a realm configuration space 520 for storing information describing an association of access rights with one or more realms. In an embodiment, realm configuration space 520 is a protected data storage region which is isolated from an execution environment of the computer platform which is external to that of ME 510. For example, realm configuration space 520 may be accessible to such an external execution environment only through ME 510.

Realm configuration space 520 may include one or more realm definitions 525a, ..., 525n. Each of one or more realm definitions 525a, ..., 525n may include information defining a respective realm—e.g. one or more of an identifier of the realm, an identifier of an enterprise domain to which the realm belongs, an identifier of a group of platforms which is associated with the realm, and a set of one or more commands which are available to those users belonging to the realm. It is understood that a realm definition may include any of a variety of combinations of additional or alternative information describing characteristics of the realm.

Based on (1) an indication of the particular realm which is determined to be associated with the local user, and (2) a corresponding one of the realm definitions 525a, ..., 525n, ME 510 may, in an embodiment, determine whether a user is permitted to have granted a request for execution of a particular command—e.g. a command for a process, application, thread, etc. which is running in the execution environment implemented by ME 510.

In an embodiment, the realm configuration space 520 may be configured remotely by an administrator 560 or other agent remote from the computer platform in which manageability engine 510 operates. For example, administrator 560 may operate a realm configuration utility 550 residing on computer, workstation or other device to communicate via a network channel 540 with the computer platform of ME 510. An ME transport layer 530 of ME 510—e.g. presented as a common ME service to the network—may expose realm configuration space 520 over the network to realm configuration utility 550. The administrator 560 may then avail of remote management functionality of ME 510 to create, delete, update, etc. one or more realm definitions in realm configuration space 520.

Figure 6:
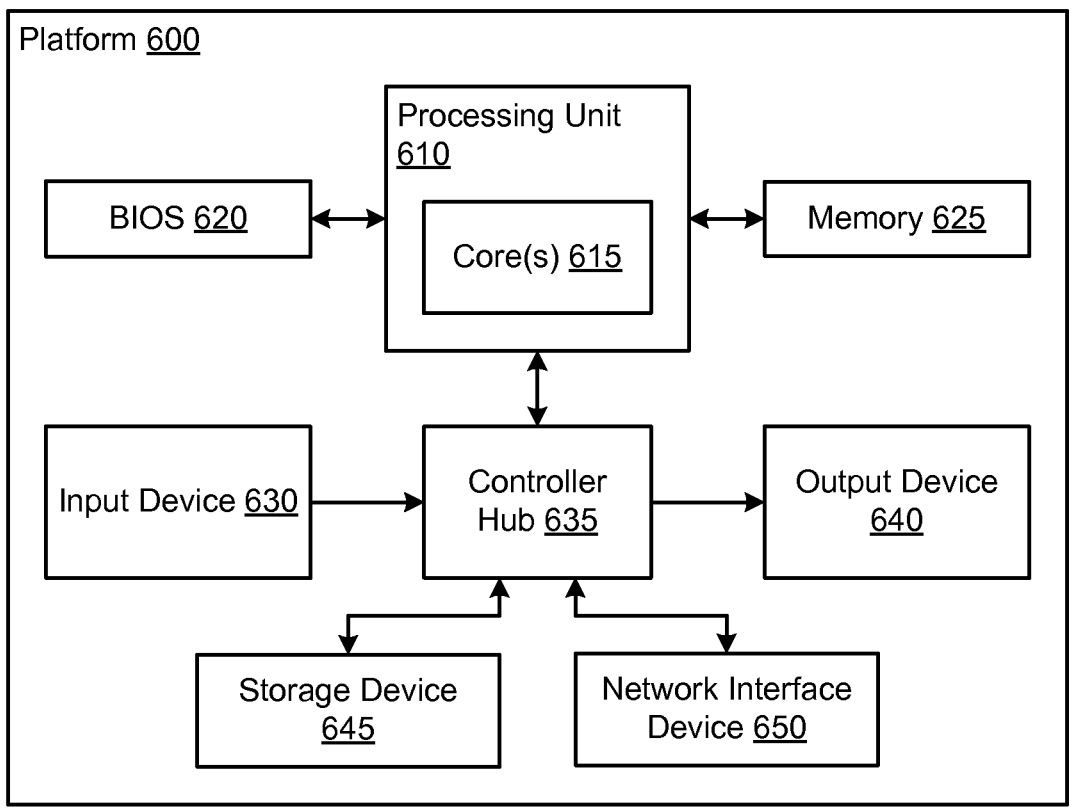
FIG. 6 is a block diagram illustrating select elements of a platform having one or more resources which are protected by a security mechanism according to an embodiment.

FIG. 6 illustrates select elements of a computer platform 600 according to certain embodiments. In various embodiments, platform 600 having one or more resources, access to which may be secured by one or more mechanisms described herein. Although the scope of the various embodiments is not limited in this respect, platform 600 may include one or more of a personal computer (PC), a personal digital assistant (PDA), an Internet appliance, a cellular telephone, a laptop computer, a tablet device, a mobile unit, a wireless communication device and/or any other such computing device.

According to illustrative embodiments, platform 600 may include a processing unit 610 directly or indirectly coupled to one or more other components—e.g. a memory 625 and a controller hub 635. Memory 625 may include a dynamic random access memory (DRAM), a non-volatile memory, or the like. In one example, memory 625 may store a software program which may be executed by processing unit 610. Additionally or alternatively, processing unit 610 may have access to Basic Input/Output System (BIOS) instructions 620—e.g. stored in memory 625 or in a separate storage device 620.

Processing unit 610 may be variously coupled to components of platform 600 via one or more address and/or data busses. It should be understood that interconnects other than or in addition to such busses may be used to connect processing unit 610. For example, one or more dedicated data and/or control lines, crossbars, etc. may be used to connect processing unit 610 to memory 625 or other devices, according to different embodiments.

Processing unit 610 may include one or more cores 615 to execute an operating system (OS), not shown. In various embodiments, access to one or more resources of platform 600 by the executing OS, by a local user of platform 600 and/or by a remote agent networked with platform 600 may be variously controlled according to operation of a manageability agent (not shown) of controller hub 635.

Controller hub 635 may couple various components of platform 600 to one another for various exchanges of data and/or control messages. By way of illustration and not limitation, controller hub 635 may include one or more of an I/O controller hub, a platform controller hub, a memory controller hub, and/or the like.

In order to illustrate various features of certain embodiments, controller hub 635 is shown coupling processing unit 610 to an input device 630 for receiving communications at platform 600, an output device 640 for sending communications from platform 600 and a storage 645 for storing data in platform 600. By way of illustration and not limitation, either or both of input device 630 and output device 640 may include one or more of a keyboard, keypad, mouse, touchpad, touch screen, display, biometric device, and the like. Storage device 645 may include one or more of a hard disk drive (HDD), solid state drive (SSD), compact disk (CD) drive, digital versatile disk drives (DVD), and/or other computer media input/output (I/O) devices. In an embodiment, one or more of input device 630, output device 640 and storage device 645 may be external, and coupled, to platform 600—e.g. as various devices peripheral to platform 600. One or more of input device 630, output device 640 and storage device 645 may be coupled to controller hub 635 by a dedicated hardware path. By way of illustration and not limitation, a given device of platform 600 may be coupled to controller hub 635 via an isolated hard path, wherein data exchanged on the isolated path is accessible from that path only via controller hub 635 or the given device. Controller hub 635 may include one or more security mechanisms to control access to resources of—e.g. a device driver for the given device and/or an authentication client to evaluate an authentication factor of a local user of platform 600, the authentication factor provided from the given device.

It is understood that any of a variety of additional or alternative devices, circuit blocks, etc. of platform 600 may be interconnected via controller hub 635, according to various embodiments. It is also understood that the particular architecture of platform 600—e.g. the relative configuration of devices, circuit blocks, etc. of platform 600 with respect to controller hub 635—is not limiting on certain embodiments.

According to illustrative embodiment, platform 600 may exchange data with other devices via a connection to a network (not shown). For example, platform 600 may include a network interface device 650—e.g. a network interface card, a wireless network interface and/or one or more antennae—to exchange network traffic with the network. The network connection may include any type of network connection, such as an Ethernet connection, a digital subscriber line (DSL), a telephone line, a coaxial cable, etc. The network may be any type of network, such as the Internet, a telephone network, a cable network, a wireless network such as, for example, a network complying IEEE standard 802.11, 6999 include one or more IEEE 802.11 related standards, IEEE 802.16 Standard for Wireless Metropolitan Area Networks and/or the like.

Techniques and architectures for protecting access to computer platform resources are described herein. In the description herein, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. An apparatus comprising:
a controller hub to couple the apparatus to one or more processor cores of the computer platform, wherein the one or more processor cores execute a general purpose operating system, wherein the controller hub to operate as a component of the computer platform, including the controller hub to receive a request to authenticate a local user of the computer platform, the controller hub including:
a manageability engine (ME) comprising a processor to execute a trusted path driver configured to exchange authentication information in a trusted path between the ME and an input/output (I/O) device external to the apparatus, the exchange in response to the received request, wherein the trusted path includes an isolated hardware path from the trusted path driver to the I/O device, wherein any data exchanged on the isolated hardware path is accessible from that isolated hardware path only via the trusted path driver or the I/O device;

the ME comprising to run an authentication client in an execution environment of the ME, the authentication client to couple to the trusted path driver to receive the authentication information and to authenticate the local user based on the authentication information.

2. The apparatus of claim 1, wherein the request to authenticate the local user includes one of a Basic Input/Output System (BIOS) request, a host application request and a pre-boot authentication (PBA) request.

3. The apparatus of claim 1, wherein authentication of the local user includes the authentication client to perform a multi-factor authentication.

4. The apparatus of claim 1, wherein the authentication client receives the authentication information according to a Kerberos authentication protocol.

5. The apparatus of claim 1, wherein the ME further comprises a realm configuration space including a definition of a realm, and wherein after the local user is authenticated, the ME is to provide the local user with access to a command based on the definition of the realm.

6. The apparatus of claim 1, further comprising:
the one or more processor cores and a memory to execute the general purpose operating system, wherein the authentication information is exchanged between the I/O device and the trusted path driver while the general purpose operating system is in a pre-boot state or a hung state.

7. The apparatus of claim 3, wherein the multi-factor authentication includes the ME to evaluate both a first factor obtained via the trusted path and a second authentication factor obtained via an agent of the apparatus which is outside of the execution environment of the ME.

8. A method comprising:
receiving at a controller hub of a computer platform a request to authenticate a local user of the computer platform, the controller hub coupled to one or more processor cores of the computer platform, wherein the one or more processor cores execute a general purpose operating system, the controller hub including a manageability engine (ME);
with a trusted path driver executing with a processor of the ME, exchanging authentication information in a trusted path between the ME and an input/output (I/O) device external to the controller hub, the exchanging authentication information in response to the received request, wherein the trusted path includes an isolated hardware path from the trusted path driver to the I/O device, wherein any data exchanged on the isolated hardware path is accessible from that isolated hardware path only via the trusted path driver or the I/O device; and
running an authentication client in an execution environment of the ME, including, with the authentication client:
receiving the authentication information; and
authenticating the local user based on the authentication information.

9. The method of claim 8, wherein the request to authenticate the local user includes one of a Basic Input/Output System (BIOS) request, a host application request and a pre-boot authentication (PBA) request.

10. The method of claim 8, wherein the authenticating the local user includes performing a multi-factor authentication.

11. The method of claim 8, wherein the ME comprises a realm configuration space including a definition of a realm, the method further comprising: after the authenticating the local user, providing the local user with access to a command based on the definition of the realm.

12. The method of claim 8, further comprising:
executing a general purpose operating system with a processor and memory of the computer platform, wherein the authentication information is exchanged between the I/O device and the trusted path driver while the general purpose operating system is in a pre-boot state or a hung state.

13. The method of claim 10, wherein the multi-factor authentication includes evaluating both a first factor obtained via the trusted path and a second authentication factor obtained via an agent of the computer platform which is outside of the execution environment of the ME.

14. A non-transitory computer readable storage medium having instructions stored thereon which, when executed by one or more processors, cause to one or more processors to:
receive at a controller hub of a computer platform a request to authenticate a local user of the computer platform, the controller hub coupled to one or more processor cores of the computer platform, wherein the one or more processor cores execute a general purpose operating system, the controller hub including a manageability engine (ME);
with a trusted path driver of the ME, exchange authentication information in a trusted path between the ME and an input/output (I/O) device external to the controller hub, the exchanging authentication information in response to the received request, wherein the trusted path includes an isolated hardware path from the trusted path driver to the I/O device, wherein any data exchanged on the isolated hardware path is accessible from that isolated hardware path only via the trusted path driver or the I/O device; and
running an authentication client in an execution environment of the ME, including, with the authentication client:
receive the authentication information; and
authenticate the local user based on the authentication information.

15. The computer readable storage medium of claim 14, wherein the request to authenticate the local user includes one of a Basic Input/Output System (BIOS) request, a host application request and a pre-boot authentication (PBA) request.

16. The computer readable storage medium of claim 14, wherein the authenticating the local user includes performing a multi-factor authentication.

17. The computer readable storage medium of claim 14, wherein the authentication client receives the authentication information according to a Kerberos authentication protocol.

18. The computer readable storage medium of claim 14, wherein the ME comprises a realm configuration space including a definition of a realm, the computer readable storage medium further comprising instructions to:
provide the local user with access to a command based on the definition of the realm, the providing access after the authenticating the local user.

19. The computer readable storage medium of claim 14, further comprising instructions to:
  execute the general purpose operating system with a processor and memory of the computer platform, wherein the authentication information is exchanged between the I/O device and the trusted path driver while the operating system is in a pre-boot state or a hung state.

20. The computer readable storage medium of claim 16, wherein the multi-factor authentication includes evaluating both a first factor obtained via the trusted path and a second authentication factor obtained via an agent of the computer platform which is outside of the execution environment of the ME.

\* \* \* \* \*